Jan. 23, 1923.

A. W. HUTCHINSON.
LIQUID INDICATOR.
FILED FEB. 23, 1918.

1,442,948

3 SHEETS-SHEET 2

Inventor;
Alexander W. Hutchinson
by his attorneys

Patented Jan. 23, 1923.

1,442,948

UNITED STATES PATENT OFFICE.

ALEXANDER W. HUTCHINSON, OF BROOKLINE, MASSACHUSETTS.

LIQUID INDICATOR.

Application filed February 23, 1918. Serial No. 218,771.

*To all whom it may concern:*

Be it known that I, ALEXANDER W. HUTCHINSON, a citizen of the United States, residing at Brookline, in the county of Norfolk and State of Massachusetts, have invented certain new and useful Improvements in Liquid Indicators; and I do hereby declare the following to be a full, clear, and exact description of the invention, such as will enable others skilled in the art to which it appertains to make and use the same.

The present invention relates to liquid consumption and level indicators and more particularly to indicators of this type employed in connection with motor vehicles.

The majority of motor vehicles are provided with some form of indicator for showing the level of the liquid in the fuel tank. As these tanks are almost universally arranged at the rear end of the chassis, however, this indicator may not be observed by the operator without getting out of the vehicle. Furthermore, the indicator is seldom illuminated, making it extremely difficult to observe the amount of fuel contained in the tank after dark.

It is accordingly an object of the present invention to provide a level indicator which may be located upon the dash or in any other position in which it is conveniently visible and which accurately indicates the level of the fuel contained in the main supply tank.

Another object of the invention is to so construct and design this indicating mechanism that it may be applied to existing types of tank indicators without modifying or changing these indicators in any manner.

Motor vehicles are not at present provided with means for indicating directly the consumption of fuel when the motor is running and it is an important desideratum, especially in connection with vehicles of this type employed for commercial purposes, that they shall be provided with some means for indicating the consumption of fuel and registering the amount of fuel so consumed.

A further object of the invention, therefore, is to provide an indicator which accurately registers and which may in addition totalize the consumption of fuel by the motor.

In the simplest and most efficient form of the invention which has yet been devised this consumption indicator is embodied in the vacuum system of fuel feed and the movements of the float in the vacuum tank are utilized to operate the consumption indicator.

With these several objects in view the various features of the invention consist in certain novel features of construction, combinations and arrangements of parts hereinafter described and claimed, the advantages of which will be obvious to those skilled in the art from the following description.

Figure 1:
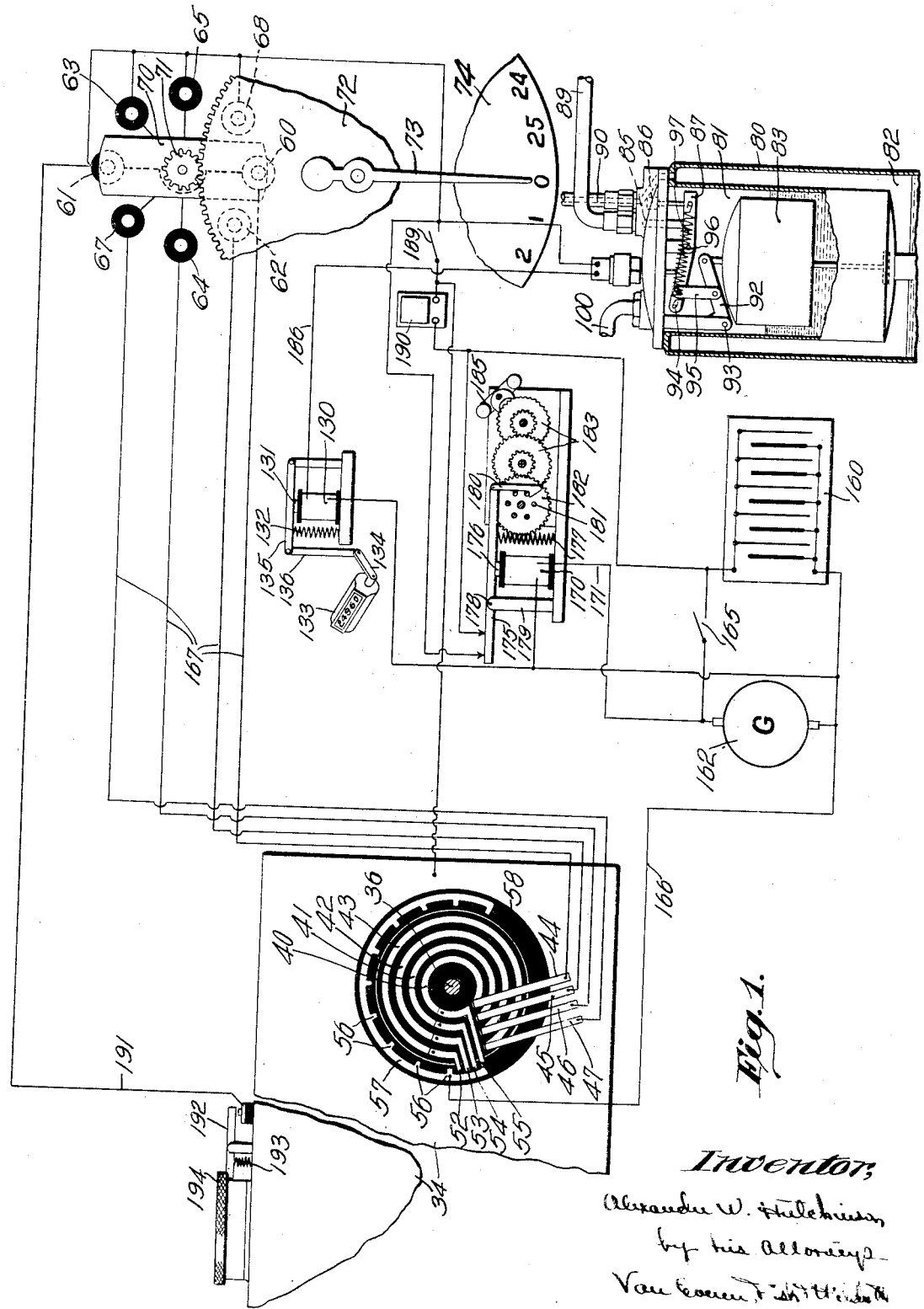
Figure 5:
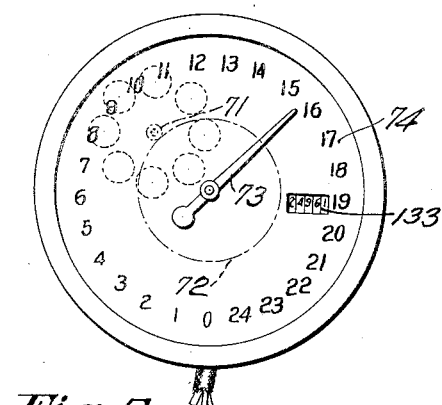
Figure 2:
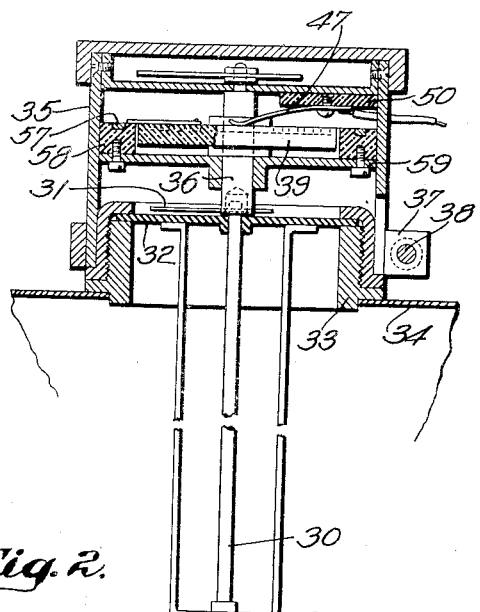
Figure 3:
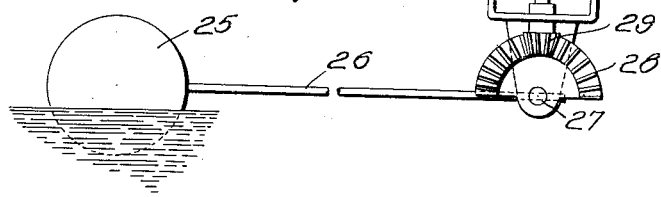
Figure 3:
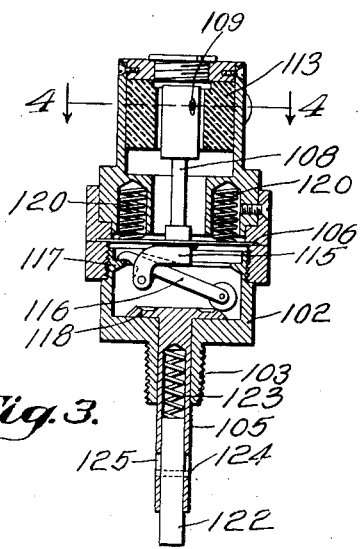
Figure 4:
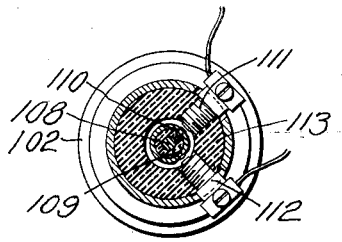
Figure 6:
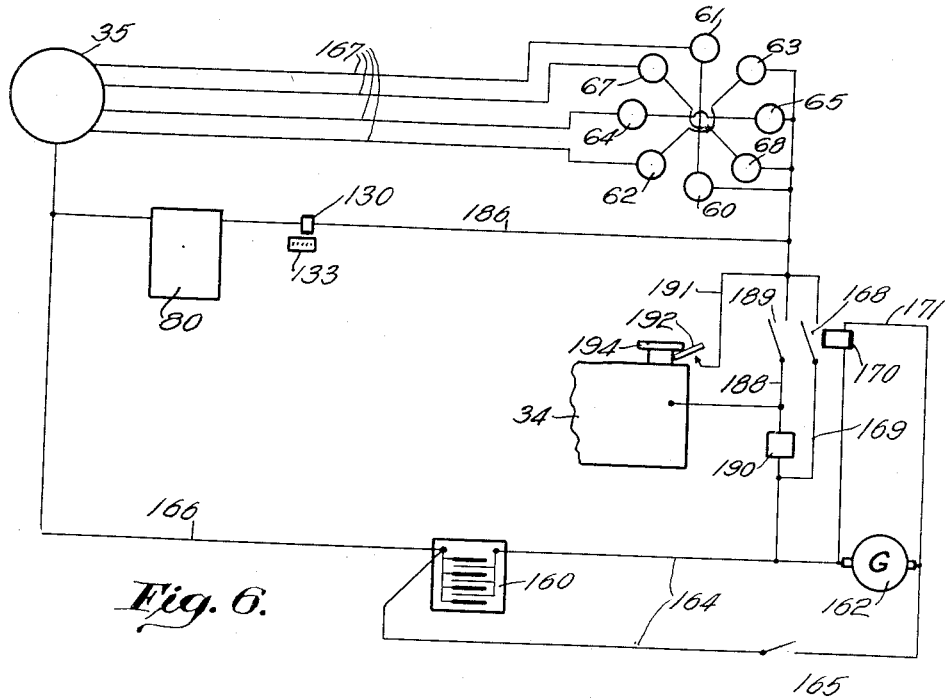
Figure 7:
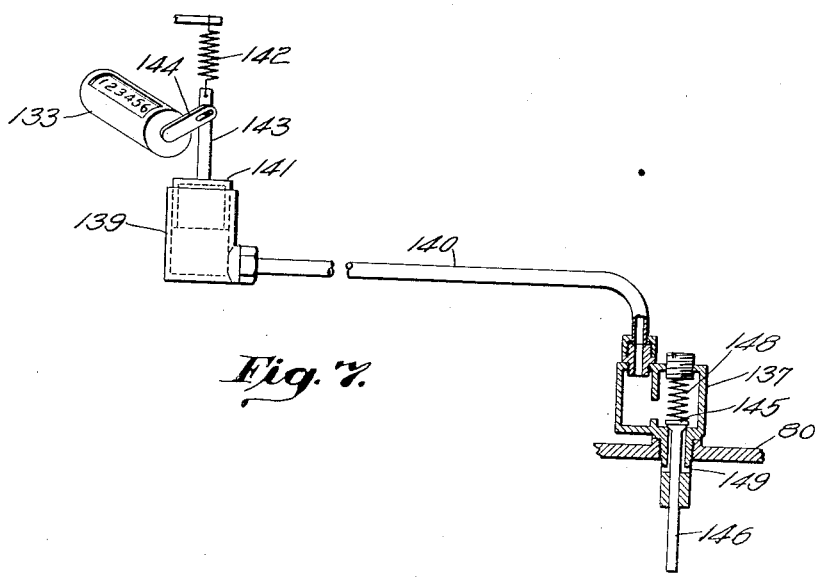

In the accompanying drawings illustrating the preferred form of the invention, Figure 1 represents a partial diagrammatic view of the indicating mechanisms and accompanying electric circuits; Fig. 2 is a detail illustrating an elevation, partly in section, of the tank indicator and connected mechanism; Fig. 3 is a longitudinal section in elevation of the switch operated by the movements of the float in the vacuum tank; Fig. 4 is a cross section upon the line 4—4 of Fig. 3; Fig. 5 is a detail illustrating the dial which may be mounted on the dash and which indicates the level of the fuel and the consumption of fuel; Fig. 6 is a diagrammatic view illustrating the various circuits; and Fig. 7 is a view of a modified form of mechanism for operatng the consumption indicator from the float lever of the vacuum tank.

The majority of motor vehicles are provided with a fuel tank slung on the rear of the chassis and from which fuel is fed to the carbureter either by the use of a pressure or vacuum. It is extremely desirable that some mechanism which is readily visible by the operator shall be provided for indicating the level of the liquid within the tank at all times. In the illustrated embodiment of the present invention this indicating mechanism is conveniently adapted to be connected with the usual indicating hand upon the fuel tank and operates a similar form of indicator which may be located on the dash of the vehicle. This indicating mechanism embodied in the tank is shown in Fig. 2 of the drawings and comprises the usual float 25 supported upon the outer end of an arm 26 pivoted at 27 and having a segment 28 connected thereto which engages with a pinion 29 secured to the lower end of a vertical shaft 30 which carries an indicating hand 31 upon its upper end, this indicating hand moving over a graduated dial 32 which is secured to a ring 33 fastened to the fuel tank 34. The arrangement is such that as the float 25 moves up and down with the level of the liquid in the tank the indicating hand 31 shows the quantity of liquid contained in the tank.

According to the present invention the movements of this hand 31 operate an indicating hand upon the dash by successively completing different circuits which actuate a movable armature connected with the hand upon the dash. These circuits are controlled by a mechanism adapted to be connected to the tank indicator without changing the latter. As shown in Figure 2 a circuit closing mechanism is enclosed in a casing 35 clamped to the tank indicator in such a manner that the lower slotted end of a shaft 36 engages over the top of the shaft 30 and hand 31 so that the shaft 36 is moved in unison with the shaft 30. The clamping of the two members together is effected by a split clamping band 37 having a threaded clamping member 38 to draw the two ends of the band together. The shaft 36 is journaled centrally within the cylindrical casing 35 and carries a commutator disc 39 which, as shown clearly in Figs. 1 and 2, comprises a series of conductor rings 40, 41, 42 and 43 which are insulated from one another and are respectively engaged by yielding feed bars 44, 45, 46 and 47 which are secured to the under side of an insulated head 50 secured within the casing 35, as shown clearly in Fig. 2. The conductor rings 40 to 43, inclusive, are provided with lateral extensions 52, 53, 54 and 55 which are adapted to successively engage during the rotation of the commutator with equally spaced lugs 56 projecting inwardly from a stationary conductor ring 57. The stationary conductor ring is imbedded in an insulator ring 58 secured to a base 59 secured to the casing. The stationary conductor ring 57 is adapted to be connected in circuit with one of the feed bars 44 to 47, inclusive, through one of the corresponding conductor rings 40 to 43, inclusive. When the commutator is rotated by a variation in the level of the liquid the circuit is changed from one feed bar to the next. For example, as shown in Fig. 1 of the drawings, the circuit is closed through the stationary ring 57, the rotating ring 40 and the lateral extension 55 engaging with one of the lugs on the ring 57 and the feed bar 44. If the commutator is then moved to the right the lateral extension 52 on the conductor ring 43 is moved into contact with the next lug upon the stationary ring 57, closing the circuit through the feed bar 47 and simultaneously opening the circuit through the feed bar 44 owing to the movement of the lateral extension 55 out of contact with the cooperating lug. Each of the feed bars is connected in circuit with the poles of electromagnets arranged in a circular formation, as shown in Fig. 1. For example, the feed bar 44 is connected with the opposite poles 60, 61 of an electromagnet. The feed bar 45 is connected with the poles 62, 63 of a similar magnet; the feed bar 46 with the poles 64, 65; and the feed bar 47 with the poles 67 and 68. A movable armature 70 is journaled to rotate across the poles and is provided with a small pinion 71 which meshes with a large gear 72 carrying an indicator hand 73. The indicator hand is journaled for rotation over a dial 74 graduated to show the quantity or volume of liquid contained in the tank. It will be obvious to those skilled in the art that with this construction the rotation of the commutator located upon the gasoline tank will through the various circuits successively energize the opposite poles of the electromagnets, causing a rotary movement of the armature 70 and correspondingly moving the indicator hand 73. It will be observed that the armature 70 will make one complete rotation for a movement of the commutator sufficient to cause all four of the extensions 52 to 55, inclusive, to contact with any one lug upon the stationary conductor ring 57; or, in other words, the commutator will make as many complete rotations as there are lugs 56 upon the band 57.

It is expedient that the consumption of fuel of the motor be recorded so that the amount of fuel consumed during any given period or for any given mileage may be readily established. In the simplest and most efficient form of the invention which has yet been devised this consumption indicator is embodied in the system of vacuum fuel feed, the movements of the float in the vacuum tank being utilized for this purpose. It will be understood that this system, which is well known commercially, embodies an upper and lower chamber which are known, respectively, as the filling and emptying chamber. A float is mounted within the filling chamber and at each movement of the float a predetermined volume of liquid is received into the filling chamber and thereafter discharged into the emptying chamber. The present invention contemplates an indicator for registering or otherwise showing the consumption of fuel and operative connections between the indicator and float for actuating the indicator in accordance with the movements of the float.

In the illustrated embodiment of the invention the vacuum tank is indicated at 80 and comprises a filling chamber 81 and an emptying chamber 82. The filling chamber 81 contains a float 83 which controls the movements of two valves 85 and 86 mounted upon an arm 87. When the arm 87 is elevated the valve 85 closes a pipe 89 leading to the intake manifold and the valve 86 opens a passage to the atmosphere through the open ended pipe 90 which is in continuous communication with the emptying chamber 82. The float 83 is connected with the arm 87 through an arm 92 fulcrumed at 93 to a fixed portion of the tank and connected with an arm 94 through a link 95. The two arms 87 and 94 are both fulcrumed at 96 and are normally retained in one of two positions by a spring 97. The filling tank is connected with the main supply tank through a pipe indicated at 100 and when the float 83 is lowered sufficiently to cause the spring to snap the arm 87 into a position in which the valve 85 is opened and the valve 86 closed a vacuum is created in the filling chamber which draws liquid through the pipe 100. As this liquid enters the filling chamber the float gradually rises until a predetermined level is reached when the arm 87 is again operated to close the valve 85 and open the valve 86 leading to the atmosphere. This relieves the vacuum within the filling chamber and permits the opening of a discharge valve, not shown, leading from the filling chamber to the emptying chamber. With this construction it will be seen that the float moves between predetermined levels, thus causing a measured volume of liquid to be drawn into the filling chamber upon each movement of the float. This movement of the float is conveniently utilized in one form of the invention by providing mechanism connected with the arm 94 which closes an electric circuit each time that the float is elevated to operate a suitably designed register. As shown in Figs. 1 and 3 of the drawings, the switch for closing the circuit comprises a casing 102 having a threaded end 103 adapted to be received in a correspondingly threaded opening formed in the top of the tank. This opening is located directly above the arm 94 so that the arm is in position to contact with a plunger 105 slidingly received within the lower portion of the casing and extending down into position to be engaged by the arm 94 when it is moved into the position shown in Fig. 1 by the combined action of the float 83 and spring 97. It is essential that the switch shall be so arranged that the contacts are not subjected to the gasolene fumes so that any liability of an explosion arising from a spark between the contact points is eliminated. To this end the diaphragm 106 is clamped in the casing and seals the lower portion of the casing which communicates with the vacuum tank from the upper portion of the casing containing the contact points. This diaphragm is provided with an upstanding contact member 108 secured to the central portion of the diaphragm and having two contact points 109 and 110 which are adapted to engage with cooperating contacts 111 and 112 threaded in an insulating bushing 113 secured in the upper part of the casing. With this construction the contact member 108 is normally retained in the position shown in Fig. 3. When the diaphragm is slightly warped the contact member is moved to the right so that the points 109 and 110 engage with the corresponding stationary contacts 111 and 112. The warping of the diaphragm is accomplished by a fixed arm 115 secured to the under portion of the diaphragm immediately beneath the contact member 108 and supporting a rocker arm 116 which at one end hooks over a ledge 117 formed upon the casing 102 and rests at its opposite end upon an enlarged head 118 formed upon the upper end of the plunger 105. With this construction an upward movement of the plunger rocks the arm 116 which fulcrums about its engagement with the ledge 117 and slightly warps the diaphragm 106 through the stationary arm 115. The stresses upon the edge of the diaphragm are partially compensated for by springs 120 received in recesses formed in the casing and bearing upon the upper face of the diaphragm adjacent the marginal portion. In order to ensure the proper actuation of the switch without breakage of parts and to compensate for possible variations in the position of the arm 94, the plunger 105 is provided with an auxiliary plunger 122 slidingly received in the lower end and normally retained in the position shown in Fig. 3 by a spring 123. The limits of movement of the plunger 122 are determined by a pin 124 extending transversely of the plunger and having its ends received in a longitudinal slot 125 formed in the plunger 105. With this construction it will be evident that upon each upward movement of the float 83 and the arm 94 the switch is operated to close the circuit and upon the return movement of the float the circuit is again opened. The closing of the electric circuit through the switch energizes a solenoid indicated at 130 on Fig. 1 which pulls an armature 131 inwardly against the action of a spring 132 and operates a counter 133 through an arm 134 extending from the shaft to the counter, an arm 135 secured to the armature of the solenoid, and a connecting link 136. This counter is suitably designed so that each unit of the counter corresponds to the volume of liquid delivered to the filling chamber at each movement of the float.

The liquid indicators are conveniently adapted to be embodied in existing types of automobile chassis which have a storage battery and a generator connected with the motor for replenishing the battery and furnishing ignition and lighting current when the motor is in operation. The indicator which shows the level of liquid in the main supply tank employs a closed circuit through which the current is continuously passing and to this end it is desirable that the indicator shall operate only when the motor is running so that the current may be supplied by the generator without draining the storage battery. To this end it will be noted upon reference to Fig. 6 showing the circuit diagram that a storage battery, indicated at 160, is connected with a generator 162 through a circuit indicated at 164 and comprising the usual hand operated switch 165 which is closed when the internal combustion motor is started. The electromagnets 61 to 67, inclusive, as well as the switch 35 mounted upon the supply tank, are located in the main storage battery circuit indicated at 166. The switch 35 controls a series of shunt circuits 167 which serve to cause the current to pass through the two poles of any one of the electromagnets, as clearly described heretofore. The passage of the current from the storage battery or generator through these electromagnets and the tank switch is controlled by a magnetically operated switch 168 located in a circuit 169 and adapted to be automatically closed when the generator is started. To this end an electromagnet 170 is located in a separate generator circuit 171 and is energized when the generator is started to close the switch 168. This switch, as shown clearly in Fig. 1 of the drawings, comprises an arm 175 connected to a plunger 176 which forms the armature of the solenoid 170 and is drawn inwardly against the pressure of a spring 177 when the solenoid is energized. The arm 175, as shown in Fig. 1, is pivoted at 178 to a stationary post 179. It is furthermore desirable that the current shall continue to pass into the indicator for a short time after the motor is stopped and the generator ceases to run and to this end mechanism is provided for delaying the opening of the switch after the current ceases to flow through the solenoid 170. This mechanism comprises a usual form of escapement which delays the return of the switch arm 175 by the spring 177. As shown in Fig. 1 of the drawings, the switch arm 175 is provided with a depending hook 180 adapted to engage with one of a series of pins 181 mounted upon the gear wheel 182. This gear wheel forms one of a train of gears indicated at 183, the rotation of which is controlled by a pivoted escapement pawl 185. As the arm 175 tends to return to an open position under the action of the spring 177 the escapement pawl, through the train of gears, delays the opening movement so that the switch, which may be of the knife form, remains closed for an appreciable length of time. In addition to the level indicator the indicator for showing the consumption of liquid is also included in the main circuit 166 and this circuit comprises the switch located upon the vacuum tank and the solenoid 130 for operating the counter 133, all located in a shunt from the main circuit indicated at 186. It is essential that the two indicators may be operated when the motor is running with the ignition cut off and the main circuit open and to this end a shunt 188 is provided in which is located a hand operated switch 189 and a buzzer or vibrator 190. This switch serves to close the circuit through both indicators when desired, the sounding of the vibrator giving warning that the switch should be opened when the necessary readings have been taken. Furthermore it is desirable that the level indicator shall be operated during the filling of the main supply tank at the rear of the chassis and to this end another shunt 191 is made to include a switch 192 which is closed by a spring 193 when the filling cap, indicated at 194, is removed to permit replenishment of the fuel supply. This circuit, as shown clearly in Fig. 6, also includes the vibrator 190.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A liquid indicator comprising a tank, a float contained within the tank, a plunger extending within the tank adapted to be operated in accordance with the movements of the float, a diaphragm, connections between the plunger and diaphragm for actuating the diaphragm, and an electric switch adapted to be operated by the movements of the diaphragm.

2. A liquid indicator comprising a tank, a float supported within the tank, a casing mounted upon the top of the tank, a diaphragm dividing the casing into two parts hermetically sealed from one another, connections between one side of the diaphragm and the float for warping the diaphragm in accordance with the movements of the float, and a movable contact member connected with the opposite side of the diaphragm and adapted to periodically close an electric circuit when the diaphragm is warped by the movements of the float.

ALEXANDER W. HUTCHINSON.